United States Patent [19]

Walter

[11] Patent Number: 4,836,359

[45] Date of Patent: Jun. 6, 1989

[54] CONVEYOR CHAIN FOR CONTAINER NEST

[75] Inventor: John Walter, Evergreen Park, Ill.

[73] Assignee: Continental Can Company, Inc., Norwalk, Conn.

[21] Appl. No.: 207,508

[22] Filed: Jun. 16, 1988

[51] Int. Cl.$^4$ .............................................. B65G 29/00
[52] U.S. Cl. ................................ 198/803.01; 198/817
[58] Field of Search ................... 198/803.01, 851, 793, 198/465.1, 465.2, 817, 833

[56] References Cited

U.S. PATENT DOCUMENTS

| | | | |
|---|---|---|---|
| 1,168,905 | 1/1916 | Paridon | 198/803.01 X |
| 2,715,958 | 8/1955 | Lindstrom et al. | 198/803.01 |
| 3,435,780 | 4/1969 | Czarnecki et al. | 198/833 X |
| 3,738,478 | 6/1973 | Tourtellotte | 198/817 X |
| 3,952,860 | 4/1976 | Specht | 198/803.01 X |
| 4,664,253 | 5/1987 | Fahrion | 198/803.01 X |
| 4,716,714 | 1/1988 | Tisma | 198/803.1 X |

FOREIGN PATENT DOCUMENTS

| | | | |
|---|---|---|---|
| 1251236 | 4/1967 | Fed. Rep. of Germany | 198/803.01 |
| 2843122 | 4/1980 | Fed. Rep. of Germany | 198/803.01 |

*Primary Examiner*—Robert J. Spar
*Assistant Examiner*—James R. Bidwell
*Attorney, Agent, or Firm*—Charles E. Brown; Paul Shapiro; Charles A. Brown

[57] ABSTRACT

This relates to a special endless conveyor chain particularly adapted to carry fixtures which are to be readily removable and replaceable on the conveyor chain. In order to accomplish this, the pins which connect together the links of a conventional conveyor chain are elongated above the conveyor chain for reception in bores within an associated fixture. The conveyor chain is formed of elongated links and shorter links with the length of the elongated links being in accordance with the general dimensions of a fixture longitudinally of the conveyor chain. Each upper one of the elongated links is provided with a flat upper surface so as to provide a supporting surface for a fixture to be mounted thereon. Instead of the usual strap-like configuration, each upper elongated link is preferably provided with an enlarged central portion which may be circular in outline to provide an adequate seat for an associated fixture. A special sprocket may be provided for the conveyor chain with the sprocket having circumferentially spaced teeth for reception between customary rollers of the conveyor chain and with the sprocket further having between each pair of teeth a radially outwardly projection for projecting between elongated links of the conveyor chain with the sprocket projection being in supporting relation with respect to an associated upper elongated link whereby a loading placed on a fixture carried by the conveyor chain is first transmitted to an associated upper elongated link and through that link to the underlying sprocket projection.

14 Claims, 1 Drawing Sheet

CONVEYOR CHAIN FOR CONTAINER NEST

This invention relates in general to new and useful improvements in endless conveyor chains, and more particularly to a conveyor chain which is specifically constructed for carrying in readily detachable and replaceable relation a fixture, such as a nest for a container to be utilized in the supporting of a container during filling and closing thereof.

In accordance with this invention, there is provided a conveyor chain which includes elongated links and relatively short links which are connected together by way of pins and wherein the pins carry sprocket teeth engaging rollers. The length of the elongated links is in accordance with the dimension of an intended fixture.

Most particularly, the pins in lieu of stopping at the top of the conveyor chain as is conventional, project a distance above the conveyor chain for reception in bores in a fixture to maintain the fixture on the conveyor chain.

Another feature of the conveyor chain is the formation of a top one of the elongated links to have an enlarged central portion so as to provide a large seating surface for a fixture to be carried by the conveyor chain.

A further feature of the invention is to provide for use in combination with the conveyor chain a sprocket which is provided at circumferentially spaced intervals with teeth for engaging the rollers of the conveyor chain and wherein intermediate the sprocket teeth the sprocket has radially outwardly projecting portions which extend between the elongated links and wherein the thickness of the projections portions generally corresponds, but is less than the spacing between elongated links of each set of elongated links whereby an upper elongated link of each set of elongated links may rest upon the associated sprocket projection to be supported thereby.

Other advantages and characteristics of the invention will appear from a reading of the following description, given purely by way of illustration and example, with reference to the accompanying drawings, in which.

Figure 1:
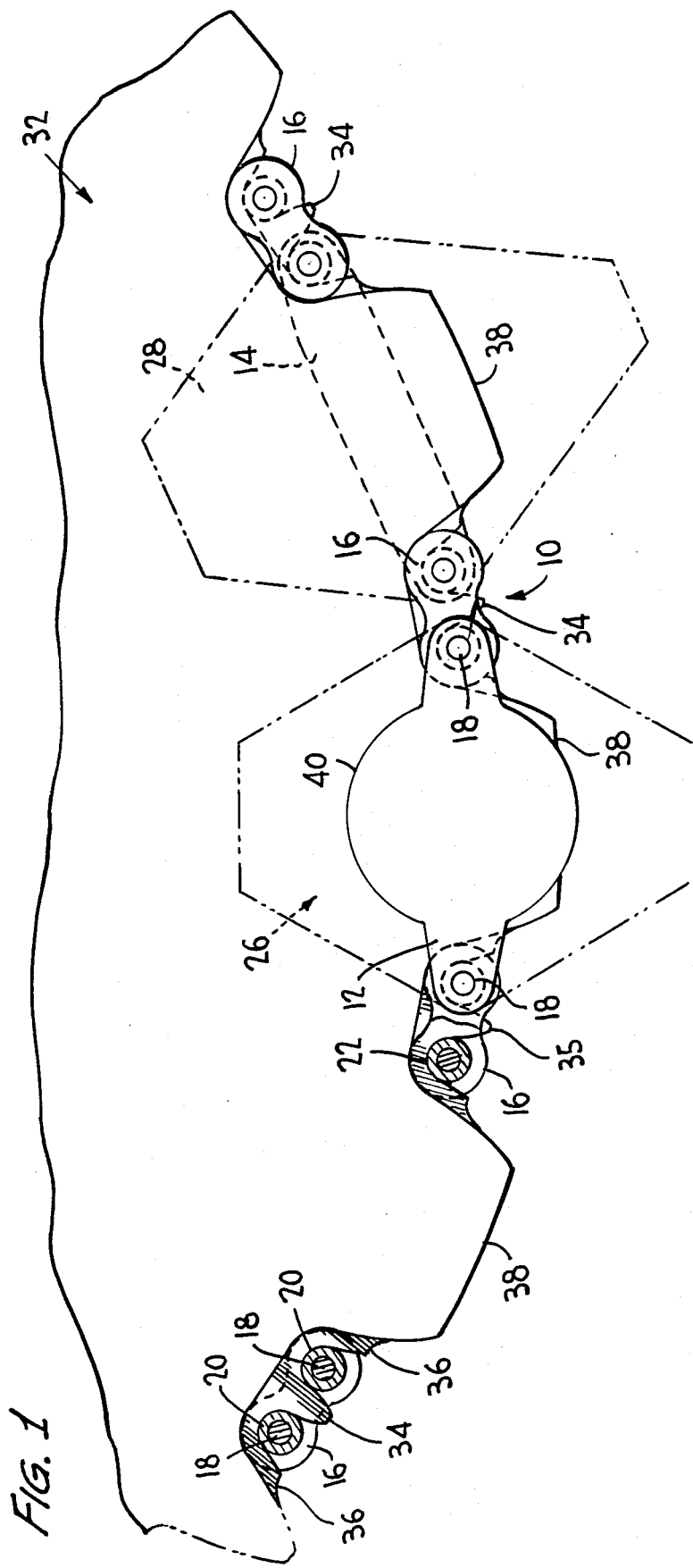
FIG. 1 is a plan view of a portion of a special sprocket having engaged therewith a portion of an endless conveyor chain formed in accordance with this invention, parts of the conveyor chain being broken away and shown in section.

Referring now to the drawings in detail, it will be seen that there is illustrated in the drawings a special endless conveyor chain which is the subject of this invention, the conveyor chain being generally identified by the numeral 10. The conveyor chain 10 includes a plurality of sets of elongated links with each set of elongated links including an upper elongated link 12 and a lower elongated link 14.

The sets of elongated links 12, 14 are joined together by sets of relatively short links 16 with the two sets of links being pivotally connected together by way of pins 18. Each pin 18 not only extends through the links 12, 14 and 16, but also carries a roller 20 for engagement with teeth of a sprocket and to space apart the links 16. It is to be noted that the pins 18 are longer than that required for the formation of the conveyor chain 10 and project upwardly above the conveyor chain 10 a considerable distance.

It is also to be noted that the components of the conveyor chain 10 are retained together by retaining rings 22 carried by lower end portions of the pins 18 and underlying links 14. Similar retaining rings 24 are carried by the pipe 18 in overlying relation to the elongated links 12.

Figure 2:
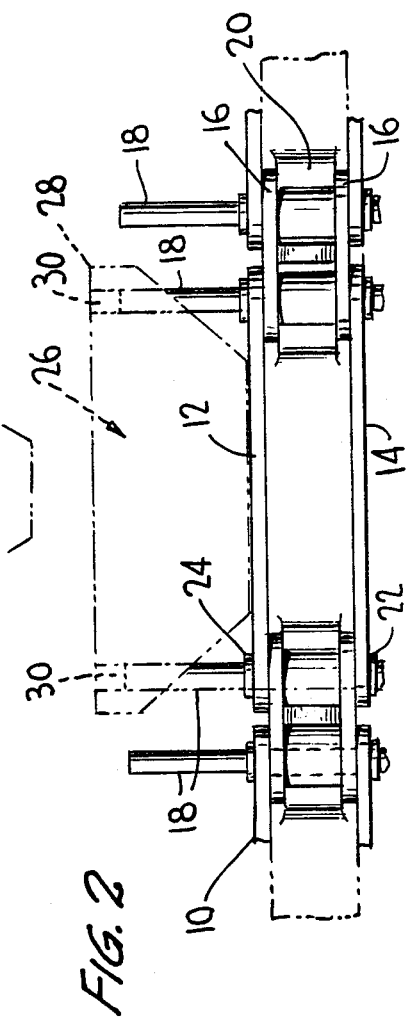
FIG. 2 is a fragmentary elevational view showing the relationship of the endless conveyor chain with the sprocket and a container supporting nest to be carried by the endless conveyor chain.

As will be readily apparent from FIG. 2, the conveyor chain 10 is intended to carry and support fixtures generally identified by the numeral 26. The primarily intended fixture 26 will be in the form of a nest for a container. Such nest is the subject of a copending application and will not be described in detail here except to specifically point out that the nest 26 is in the form of a housing 28 having adjacent longitudinal ends thereof vertical bores 30. The spacing of the bores 30 is in accordance with the spacing of the pins 18 along the elongated links 12, 14.

A special sprocket, generally identified by the numeral 32, is utilized with the conveyor chain 10. The sprocket 32 has a peripheral portion of a thickness corresponding generally to, but less than the spacing between the elongated links 12, 14. The sprocket 32 is provided at circumferentially spaced intervals with projecting teeth 34 and cooperating tooth portions 36 as is clearly shown in FIG. 1. The spacing of the teeth 34 is such that each tooth 34 will be received between an adjacent pair of the rollers 20.

At this time it is pointed out that the thickness of the teeth 34 and adjacent tooth portions 36 is generally equal to, but less than the spacing of the shorter links 16.

It is also to be noted that the sprocket 32 is provided with radially projecting portions 38 which are disposed between adjacent teeth 34 and which project radially outwardly beyond the teeth 34. These projecting sprocket portions 38 are of the basic thickness of the periphery of the sprocket 32 and thus, as is clearly shown in FIG. 2, project radially outwardly between the elongated links 12, 14 with the elongated links 12 resting upon the projections 38 in supported relation.

From the foregoing, it will be seen that each fixture 26 seats on an associated elongated link 12 which, in turn, is seated on a sprocket projection 38. Thus each fixture 26 is supported against vertical deflection so that when a load is placed thereon as in the case of the sealing of a container, the fixture or nest 26 will remain vertically stationary so that a proper relationship may be maintained between, for example, a container and a sealing head for closing such container.

It is to be particularly noted that while the elongated lower link of each set of elongated links is conventionally in the form of a strap-like member, the upper elongated link 12 has an enlarged central portion 40 to provide an increase seating area for the fixture 26. It has been found that when the enlargement 40 is circular in outline, a proper seat for the fixture 26 is provided.

Although only a preferred embodiment of the endless conveyor chain has association with a sprocket has been specifically illustrated and described, minor variations may be made in the construction of the conveyor chain or the sprocket without departing from the spirit and scope of the invention as defined by the appended claims.

I claim:

1. A conveyor chain particularly adapted to support a nest for a container in a container closing apparatus, said conveyor chain comprising sets of elongated links and sets of shorter links joined together by pins, there being one pin at each end of each set of elongated links, and there being a roller carried by each pin between said sets of links for engaging sprocket teeth, said pins freely extending above associated upper links of said sets of elongated links and pairs of said pins at opposite ends of said sets of elongated links forming means for removably and replaceably mounting a nest.

2. A conveyor chain according to claim 1 wherein said links are generally horizontally disposed and each said upper elongated link having a flat upper surface for forming a seat for a respective nest.

3. A conveyor chain according to claim 2 wherein said shorter links are positioned vertically between said elongated links.

4. A conveyor chain according to claim 3 wherein each of said rollers is positioned between shorter links of a set of shorter links to space apart shorter links of each set of shorter links to control the spacing of said shorter links along said pins.

5. A conveyor chain according to claim 3 wherein each of said rollers is positioned between shorter links of a set of shorter links to space apart shorter links of each set of shorter links to control the spacing of said shorter links along said pins, and said spaced apart shorter links controlling the spacing of said elongated links along said pins.

6. A conveyor chain according to claim 1 wherein said shorter links are positioned vertically between said elongated links.

7. A conveyor chain according to claim 6 wherein each of said rollers is positioned between shorter links of a set of shorter links to space apart shorter links of each set of shorter links to control the spacing of said shorter links along said pins.

8. A conveyor chain according to claim 6 wherein each of said rollers is positioned between shorter links of a set of shorter links to space apart shorter links of each set of shorter links to control the spacing of said shorter links along said pins, and said spaced apart shorter links control the spacing of said elongated links along said pins.

9. A conveyor chain according to claim 1 wherein each of said rollers is positioned between shorter links of a set of shorter links to space apart shorter links of each set of shorter links to control the spacing of said shorter links along said pins.

10. A conveyor chain according to claim 1 wherein each of said rollers is positioned between shorter links of a set of shorter links to space apart shorter links of each set of shorter links to control the spacing of said shorter links along said pins, and said spaced apart shorter links control the spacing of said elongated links along said pins.

11. A conveyor chain according to claim 8 wherein there is a sprocket for said conveyor chain, said sprocket having outer peripheral portions of a thickness generally equal to but less than the vertical spacing between said elongated links, said outer peripheral portions extending between said elongated links in supporting relation for upper ones of said elongated links.

12. A conveyor chain according to claim 11 wherein intermediate each pin of said sprocket outer peripheral portion are roller engaging teeth of a thickness less than the thickness of said sprocket outer peripheral portion and generally equal to but less than the vertical spacing between said shorter links.

13. A conveyor chain particularly adapted to support a nest for a container in a container closing apparatus, said conveyor chain comprising sets of elongated links and sets of shorter links joined together by pins, there being one pin at each end of each set of elongated links, and there being a roller carried by each pin between said sets of links for engaging sprocket teeth, said pins extending above associated upper links of said sets of elongated links and forming means for removably and replaceably mounting a nest, said links being generally horizontally disposed and each said upper elongated link having a flat upper surface for forming a seat for a respective nest, said upper elongated links have widened central portions.

14. A conveyor chain according to claim 13 wherein said upper elongated links widened central portions are of a circular outline.

* * * * *